United States Patent
Tropea (10) Patent No.: US 10,415,858 B2
(45) Date of Patent: Sep. 17, 2019

(54) APPARATUS FOR AIR-CONDITIONING OF ENVIRONMENTS IN THE MARINE FIELD

(71) Applicant: TMD Marine LTD, Mayfair (GB)

(72) Inventor: Maurizio Tropea, Castelletto Sopra Ticino (IT)

(73) Assignee: Maurizio Tropea, Castelletto Sopra Ticino (IT)

( * ) Notice: Subject to any disclaimer, the term of this patent is extended or adjusted under 35 U.S.C. 154(b) by 220 days.

(21) Appl. No.: 15/303,259

(22) PCT Filed: Apr. 8, 2015

(86) PCT No.: PCT/IB2015/052545
§ 371 (c)(1),
(2) Date: Oct. 11, 2016

(87) PCT Pub. No.: WO2015/155706
PCT Pub. Date: Oct. 15, 2015

(65) Prior Publication Data
US 2017/0115037 A1    Apr. 27, 2017

(30) Foreign Application Priority Data

Apr. 9, 2014  (IT) .............................. RM2014A0191

(51) Int. Cl.
*F25B 13/00* (2006.01)
*B63J 2/04* (2006.01)
(Continued)

(52) U.S. Cl.
CPC ................. *F25B 13/00* (2013.01); *B63J 2/04* (2013.01); *F25B 49/00* (2013.01); *F25B 49/02* (2013.01);
(Continued)

(58) Field of Classification Search
CPC . B63J 2/04; F25B 49/02; F25B 49/022; F25B 2313/003; F25B 2313/004;
(Continued)

(56) References Cited

U.S. PATENT DOCUMENTS

| 6,102,113 A * | 8/2000 | Cowans ................. B23Q 11/10 165/104.33 |
| 2013/0227976 A1* | 9/2013 | Yamashita .............. F24F 3/065 62/126 |

FOREIGN PATENT DOCUMENTS

| EP | 2 312 226 A2 | 4/2011 |
| EP | 2 508 817 A1 | 10/2012 |
| EP | 2 557 377 A1 | 2/2013 |

OTHER PUBLICATIONS

International Search Report, dated Aug. 5, 2015, from corresponding PCT application.

\* cited by examiner

*Primary Examiner* — Jonathan Bradford
(74) *Attorney, Agent, or Firm* — Young & Thompson (57) ABSTRACT

An apparatus for air-conditioning of watercraft and the like including: an electronically controlled variable-r.p.m. compressor, a main gas/water condenser (5), at least one environmental heat-exchanger (3) with an electronically controlled fan (14), at least one electronically controlled expansion valve (8), and at least one first electronic control unit (4) programmed for calculating continuously a temperature deviation detected (DeltaT=T_ad−T_a), and as a function of the temperature deviation regulating in combination, the r.p.m. of the compressor (1), opening of the flow valve (8), and the r.p.m. of the fan of the heat-exchanger (3).

11 Claims, 7 Drawing Sheets

(51) Int. Cl.
*F25B 49/00* (2006.01)
*F25B 49/02* (2006.01)

(52) U.S. Cl.
CPC ...... *F25B 49/022* (2013.01); *F25B 2313/003* (2013.01); *F25B 2313/004* (2013.01); *F25B 2313/0233* (2013.01); *F25B 2313/02731* (2013.01); *F25B 2313/0312* (2013.01); *F25B 2313/0314* (2013.01); *F25B 2313/0315* (2013.01); *F25B 2600/0253* (2013.01); *F25B 2600/11* (2013.01); *F25B 2600/13* (2013.01); *F25B 2600/2515* (2013.01); *F25B 2700/197* (2013.01); *F25B 2700/21* (2013.01); *F25B 2700/2104* (2013.01); *F25B 2700/21151* (2013.01); *F25B 2700/21152* (2013.01); *F25B 2700/21161* (2013.01); *F25B 2700/21162* (2013.01); *F25B 2700/21163* (2013.01); *F25B 2700/21174* (2013.01); *F25B 2700/21175* (2013.01); *Y02T 70/72* (2013.01)

(58) Field of Classification Search
CPC .... F25B 2313/0233; F25B 2313/02731; F25B 2313/02741; F25B 2313/0312; F25B 2313/0314; F25B 2313/0315; F25B 2600/0253; F25B 2600/11; F25B 2600/13; F25B 2600/2515; F25B 2600/197; F25B 2600/21; F25B 2600/2104; F25B 2600/21151; F25B 2600/21152; F25B 2600/21161; F25B 2600/21162; F25B 2600/21163; F25B 2600/21174; F25B 2600/21175; Y02T 70/72

See application file for complete search history.

APPARATUS FOR AIR-CONDITIONING OF ENVIRONMENTS IN THE MARINE FIELD

TECHNICAL SECTOR

The present invention relates to an air-conditioning system, and more in particular a system for air-conditioning environments of ships, yachts, watercraft, etc., and in general environments that are located in the marine field, such as for example off-shore platforms.

Currently, systems are known for conditioning nautical environments of the "ON/OFF" type, i.e., systems that are either on or off.

The basic features of these systems are:
just one available power;
temperature of the conditioned environment varying by at least +/−3° C. with respect to the temperature setpoint (in optimal conditions of arrangement of the diffusers);
ambient temperature varying continuously given that the thermostat operates at intervals, with on/off machine cycles; and
slow reaching of temperature setpoint.

This operating mode provides a rather approximate environmental temperature regulation: when the system is activated it introduces into the environment to be conditioned air at a certain fixed temperature (10° C.), with a considerable difference with respect to the air present. When the temperature is reached, the system switches off (OFF) and resumes operation when the temperature sensors detect a temperature higher than a certain assigned value.

This determines a sawtooth timeplot of the temperature, with temperature variations that are considerable (+/−4° C.) for the people present in the environment (non-optimal regulation). Furthermore, the air is introduced into the environment at a temperature that is very different from the one present with possible even situations of considerable discomfort for the people present in the proximity of the air diffuser.

Furthermore, ON/OFF systems are unable to supply air at a different temperature in the various air-conditioned environments other than with purely empirical systems. In a boat there frequently occur in fact environmental situations that are differ considerably from one level to another: for example, in summer, on the upper decks that are subjected to the action of heating due to sunlight, there is a situation of much higher temperature than on the lower decks, which are partially immersed in the water, with a thermal difference of approximately 20° C. Since air at the same temperature is sent into the two environments, there arise situations of discomfort in one or the other and any compromise in any case represents a non-optimal situation.

From the patent application No. VA2010A00049, filed in the name of the present applicant, there is moreover known an air-conditioning system provided with electronic control designed to carry out regulation of an inverter compressor in order to maintain the ambient temperature constant or even to adapt it to the requirements of the people present.

However, it has been found that systems of a known type present some limits as regards their efficiency and hence the possibility of being able to air-condition environments of large dimensions or in unfavourable climatic or weather conditions by keeping the energy demand relatively low.

The above drawback is particularly felt in the nautical field where it is desirable to have on board apparatuses of small dimensions and with a limited energy consumption.

Purpose of the Invention

Consequently, a first purpose of the present invention is to devise an air-conditioning apparatus for watercraft and the like that will overcome the drawbacks of systems of a known type.

SUMMARY OF THE INVENTION

The above purposes have been achieved with an apparatus according to at least one of the annexed claims.

A first advantage lies basically in the fact that the apparatus enables control of the current values of the parameters that are significant for the purposes of energy efficiency, such as the power supplied, the latent power, and the sensible power, and the system is capable of operating always substantially in conditions of maximum efficiency, without penalizing the rapidity in reaching the conditions of temperature set by the user.

A further advantage lies in the possibility of using compressors of lower electric power and cubic capacity as compared to traditional systems, albeit reaching the same thermal power.

A further advantage is represented by the fact it becomes possible to provide air-conditioning apparatuses of smaller dimensions as compared to traditional ones.

LIST OF THE DRAWINGS

The above and further advantages will be better understood by any person skilled in the branch from the ensuing description and from the annexed drawings, which are provided purely by way of non-limiting example and in which.

DETAILED DESCRIPTION OF THE INVENTION

With reference to the attached drawings, an apparatus A for air-conditioning of watercraft and the like, in particular ships and yachts, is now described.

The apparatus comprises a variable-r.p.m. compressor 1, preferably an electronically controlled inverter compressor for compression of a mass of a phase-change working fluid.

The fluid is supplied by a line 10 of fluid in the gaseous phase to the compressor, said line communicating with a duct 19 for outlet of compressed 10 gas, which gives out into an electronically controlled four-way valve 9 in communication also with said gas line 10 at inlet to said compressor 1 and with a main gas/water condenser 5 via a gas duct 23.

The condenser moreover communicates with a line 11 of fluid in the liquid phase and is traversed by a duct 18 for passage of a flow of seawater moved by a purposely provided seawater-suction pump of the electronically controlled variable-r.p.m. type.

Provided along the line 11 is at least one electronically controlled flow valve 8 intermediate with respect to at least one environmental heat-exchanger 3 of the type comprising one or more evaporation/condensation batteries for thermal conditioning of a flow of air emitted by an electronically controlled fan 14, which at the other end communicate with the line 10 of fluid in the gaseous phase.

Figure 1:
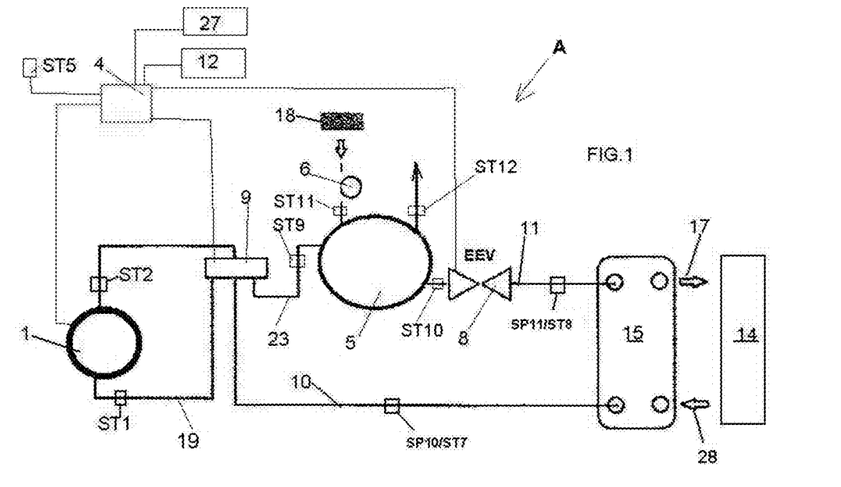
FIG. 1 is a schematic illustration of a first embodiment of the apparatus according to the invention.

According to the invention, in the embodiment illustrated in FIG. 1 the heat-exchanger 3 is provided with evaporation/condensation batteries comprised in a water/gas heat-exchanger 15 associated to a fancoil via water delivery and return lines 17, 28.

Figure 2:
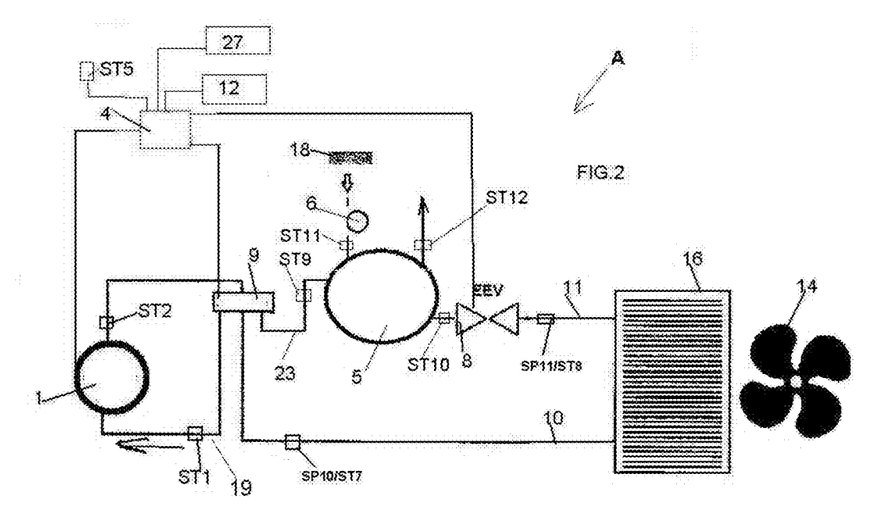
FIG. 2 is a schematic illustration of a second embodiment of the apparatus according to the invention.

In the embodiment illustrated in FIG. 2, the heat-exchanger 3 is provided, instead, with batteries 16 comprised in an air evaporator 16 associated to a fan.

Figure 3:
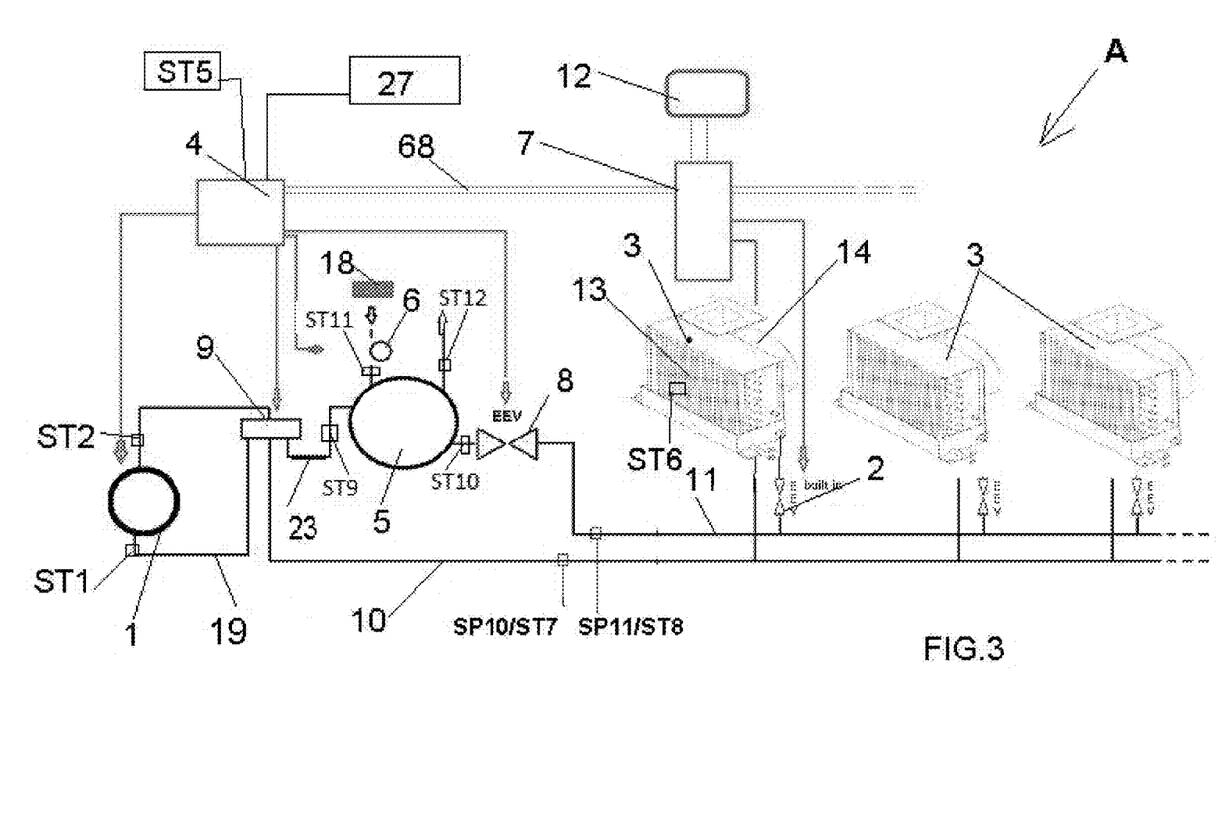
FIG. 3 is a schematic illustration of a third embodiment of the apparatus according to the invention.

Finally, illustrated in FIG. 3 is a configuration of the apparatus with heat exchangers of a split type, each associated to an environment to be air-conditioned and provided with respective evaporation batteries 13.

The apparatus further comprises a distribution of temperature sensors, namely:
  a first temperature sensor ST1 and a second temperature sensor ST2 for detection of the temperature of the gas Tg_in, Tg_out at inlet to and outlet from said compressor 1, respectively;
  sensors ST5 and ST6 for instantaneous reading, respectively, of the ambient temperature of the air T_a and of the conditioned air at outlet from the heat-exchanger 3;
  sensors ST7, ST8 for instantaneous reading of the surface temperature of the ducts of the gas line 10 and liquid line 11, respectively,—said ducts being made of thermally conductive material, for example copper—for calculation of the latent power;
  pressure sensors SP10, SP11 associated to the sensors ST7 and ST8 for calculation of the sensible power of the working coolant in the gas and liquid lines, respectively;
  sensors ST9, ST10 for instantaneous reading of the temperature of the working fluid upstream and downstream, respectively, of the condenser 5; and
  means, preferably of the touch-screen type, for entering a desired ambient temperature T_ad;

The apparatus is moreover provided with at least one first electronic control unit 4, which receives the temperature values from the sensors and from the input means referred to above, and is programmed for controlling at least:
  r.p.m. of the compressor 1 and hence the power introduced into the system;
  opening of the flow valve 8 and hence the conditions of expansion of the fluid;
  r.p.m. of the fan 14 of the heat-exchanger 3 and hence the degree of disposal of thermal power through the heat-exchanger; and
  r.p.m. of the variable-r.p.m. pump 6 and hence the degree of the disposal of thermal power through the condenser 5.

Figure 5:
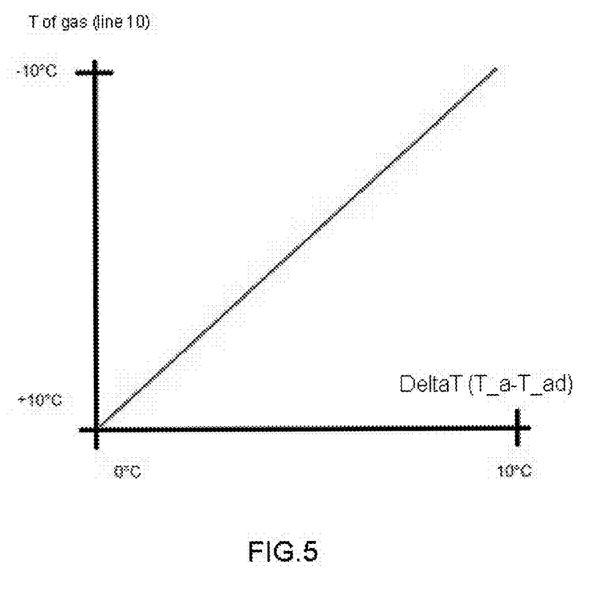
FIGS. 5-9 show some operating curves of the apparatus according to the invention.
Figure 6:
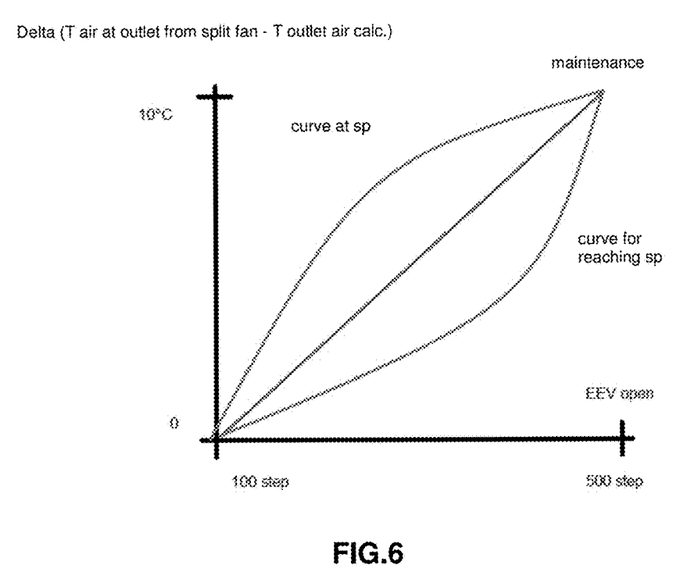
Figure 7:
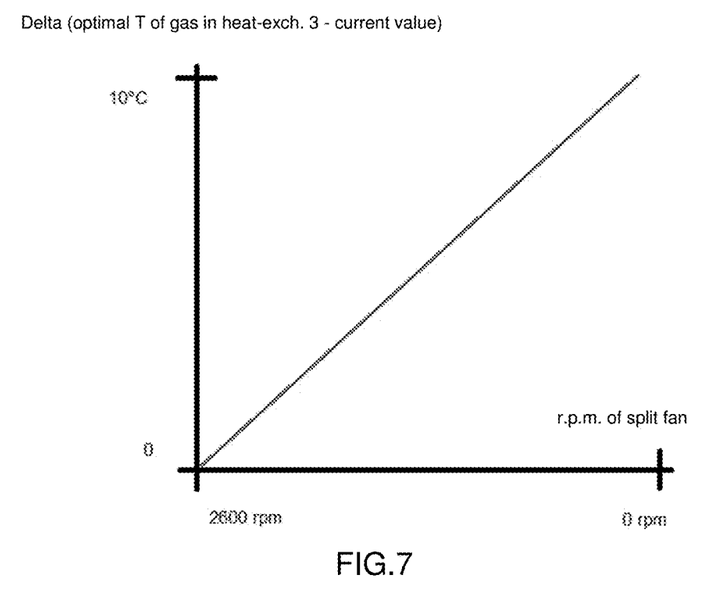
Figure 8:
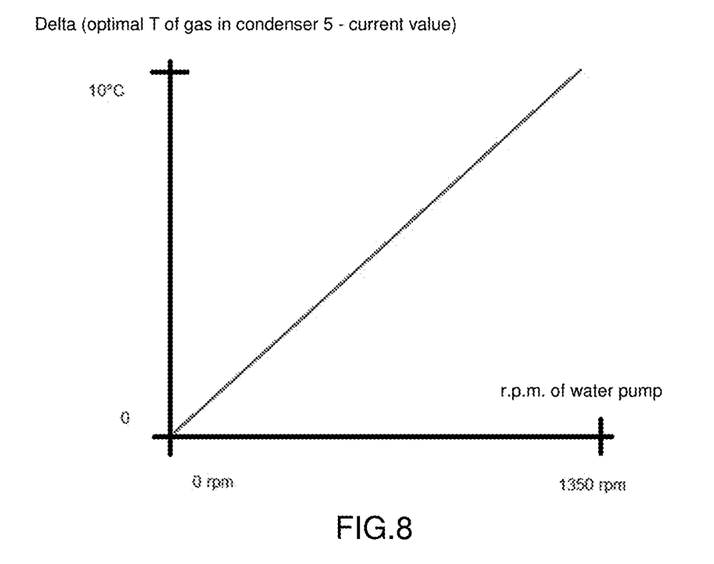
Figure 9:
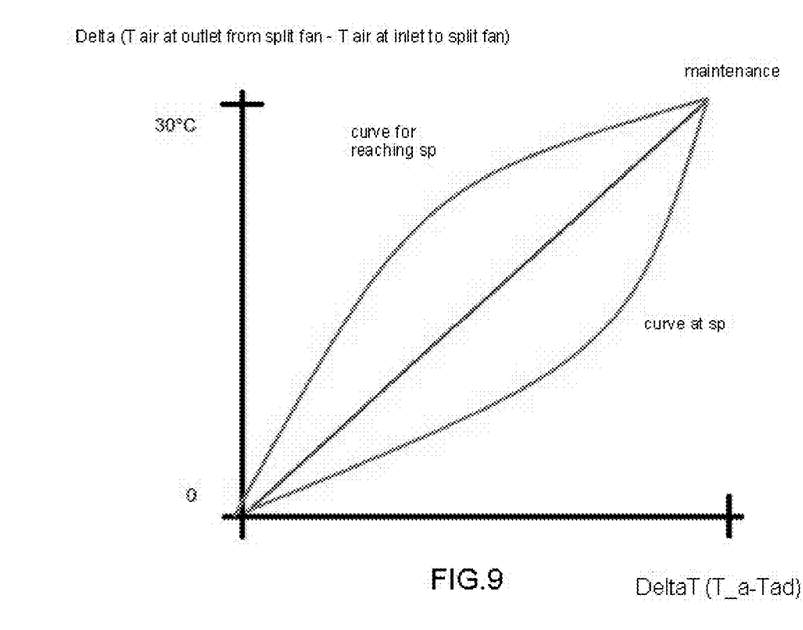

According to the invention, the first electronic control unit 4 calculates continuously a detected temperature 20 deviation DeltaT=T_ad−T_a, and as a function of said temperature deviation regulates in combination:
  r.p.m. of the compressor 1 on the basis of a preset operating curve, represented by way of example in FIG. 5, so as to obtain and maintain an output temperature of the compressed gas T_out associated to the detected value of the temperature deviation DeltaT; appearing on the abscissae in the graph of FIG. 5 is the deviation DeltaT between ambient temperature T_a and temperature setpoint T_ad and on the ordinates the temperature T of evaporation of the gas on the line 10 that the compressor will have to maintain in the conditioning step; the pressure and temperature probe SP10 reads the current pressure and accelerates the motor until the pre-set value is reached; appearing, instead, in FIG. 9 is the qualitative curve, in acceleration, deceleration, and maintenance, that links the deviation DeltaT between the current ambient temperature T_a and the temperature setpoint T_ad with the values read by ST7-ST8, i.e., the temperatures at input to and output from the heat exchangers 3; these values, together with the values of SP10 and SP11 and of ST6 enable calculation of sensible power, latent power, and total power; the result of the energy produced will be confirmed by the reading on ST6; namely:
  in acceleration of the compressor, to reach the set point the control unit checks on the heat exchangers 3 whether the latent power PL is higher than a certain percentage, for example 5%, of the sensible power PS, and consequently the r.p.m. of the compressor 1 decreases because it is producing more heat than the heat-exchanger 3 can manage to dissipate;
  in a deceleration step, the power demand on the compressor is equal to the calculated power minus the latent power, with recovery of the excess power;
  in maintenance at setpoint, regulation causes the sensible power and the latent power to coincide with dissipation of all the energy produced;
opening of the flow valve 8 for maintaining a desired optimal value of the temperature of the working fluid in the heat-exchanger 3; qualitatively illustrated in FIG. 6 are the curves of regulation of the solenoid valve 8 in the various steps where the desired value of the ambient temperature (i.e., the setpoint sp) is reached, after said value has been reached, and during maintenance of said value; advantageously, the unit 4 can be programmed for controlling opening of the valve 8 so that it will generate a variable working temperature via the fan coil or water heat-exchange plate 3 according to the thermal load of the system, or else, alternatively, so as to keep the fan coil or heat-exchange plate 3 at fixed temperature, regulating, however, the delivery of thermal power and the flow of the coolant by means of the inverter compressor 1, in a progressive way directly proportional to the r.p.m. of the compressor.
r.p.m. of the fan of the heat-exchanger 3 to maintain a pre-set optimal value of the temperature of evaporation/condensation of the gas in the batteries 13 for the purposes of efficiency of the thermal cycle; for example, in the case of use of working fluid of the R410A type, values of from 0° C. to +7° C. will be used in evaporation, and values of from 40° C. to 50° C. will be used in condensation; appearing in FIG. 7 is a qualitative curve from which it may be seen that the control unit applies a "software brake" to the fan if the temperature T of the gas at outlet from the batteries is not at the optimal value; the brake is greater the higher the temperature deviation; advantageously, thanks to the invention electronic management of the r.p.m. of the fan 14 prevents the temperature of the gas from going beyond the pre-set parameters, which would lead to higher consumption and lower thermal yield; by way of example, if the user via the data-input means 12 sets a temperature considerably far from the ambient temperature and sets the fan manually to the maximum r.p.m., for some instants the electronically controlled fan will not function at the maximum r.p.m. until the battery 13 is filled properly and a temperature of outgoing gas at the desired value is detected; at this point, the fan will be accelerated and can operate at the maximum r.p.m.; in the case where optimal filling of the battery is lost, the fan will again be slowed down to enable the right working point to be reached again, without requiring excessive energy from the compressor; the system calibrated according to the fluid used will optimize evaporation and condensation of the gas at the optimal value so as to require as little mechanical energy as possible, affording maximum chemical and thermal yield; and r.p.m. of the pump 6 as a function of a pre-set optimal value of the temperature of the gas in the condenser 5 for the purposes of efficiency of the thermal cycle; for example, appearing in FIG. 8 is a qualitative curve from which it may be seen that the r.p.m. of the pump increases as the deviation between the optimal temperature and the detected temperature increases.

The apparatus can operate both as air-conditioning system, i.e., for cooling environments, and as heat pump for regulating heating of the watercraft.

In a possible example of use of the apparatus, regulation is obtained as described hereinafter.

Upon turning-on of the apparatus, the unit 4 reads the temperature deviation and hence the thermal power demand of the user and regulates the r.p.m. of the compressor 1, opening of the valve 8, the r.p.m. of the fan 14, and the r.p.m. of the pump 6 on the basis of the pre-set curves appearing qualitatively in FIGS. 5-9.

As may be seen, to high values of temperature deviation DeltaT there initially corresponds a relatively high value of the r.p.m. of the compressor and a low value of the r.p.m. of the fan so as to bring the temperature of the gas T10 rapidly to the optimal value and obtain a rapid filling of the batteries 13 in conditions of maximum efficiency.

With progressive filling of the batteries 13, the fan may reach the maximum r.p.m., and thus also the compressor will reach its maximum r.p.m. (if necessary) to be able to deliver the maximum power in order to reach the ambient-temperature setpoint T_ad rapidly. Advantageously, waiting for proper filling of the battery in optimal working conditions enables the compressor to work in better conditions so reducing considerably consumption, roughly by 30% as compared to known systems.

When the ambient setpoint T_ad is reached, the r.p.m. of the compressor is reduced down to a maintenance value, and so also the r.p.m. of the fan 14 will be reduced according to the maintenance curve.

In the air-conditioning mode, the water pump 6 is regulated by the control unit so that, in any circumstance, on the line 11 a constant and optimal temperature is maintained for the type of fluid used.

In the heating mode, the pump 6 is instead regulated for maintaining at constant temperature, in the heat-exchanger 5, evaporation of the gas that has to be drawn in by the compressor. Advantageously, with this regulation of the water pump 6 it is possible to use seawater at temperatures of down to −15° C., as against the much higher limit of temperature, roughly 7° C., below which in traditional systems it is necessary use heating sources, such as boilers and the like.

Advantageously, thanks to the invention heat-exchange in the condenser 5 occurs at a constant and defined temperature, and it is thus possible to obtain a complete liquefaction of the gas leaving the heat-exchanger, without any gas bubbles and hence with the possibility of working in an optimal way in the cooling cycle thus obtaining maximum efficiency from the condensation process. Under-cooling can be managed and varied electronically via control of the flow of water by means of the expansion valve 8 set at the outlet of the condenser or else via simultaneous management of partialization of the electronically controlled expansion valves 2 (FIG. 3) set on the heat exchangers 3 installed on the system.

According to the preferred embodiment illustrated, regulation of the electronically controlled components of the apparatus, i.e., the compressor 1, the condenser 5 with the pump 6, the heat-exchanger 3 with the fan 14, the four-way valve 9, the expansion valve 8 and/or the expansion valve 2, is obtained in combination in order to optimize thermal efficiency of the system as a whole. It is understood, however, that specific technical advantages are obtained thanks to the invention also by means of individual regulation of one or more of said components, which are provided with connection to an electronic control unit and with sensors for detecting the state (temperature and/or pressure) of the working fluid set upstream and downstream of the component itself.

Illustrated schematically in FIG. 3 is a configuration of the apparatus with a plurality of heat exchangers 3 associated to a respective environment, each of which comprises a second electronic control unit 7, connected to the first control unit 4, preferably via a two-wire digital data line 68, for example of an RS485 Modbus or CANbus type.

In this configuration, the secondary control units 7 regulate the fans 14 of the various heat exchangers 3 and are connected both to the means 12 for input of a desired ambient temperature and to the sensor ST5 for detecting the temperature of the associated environment in order to calculate the specific temperature deviation DeltaT of each environment.

Each heat-exchanger 3 further comprises an electronically controlled expansion valve 2, regulated by the corresponding unit 7 and set along the liquid line 11. Advantageously, the secondary control cards 7 are programmed for regulating in combination the r.p.m. of the fan 14 and opening of the expansion valve 2 for maintaining the pre-set optimal value of the temperature of evaporation/condensation of the gas in the batteries 13.

Figure 4:
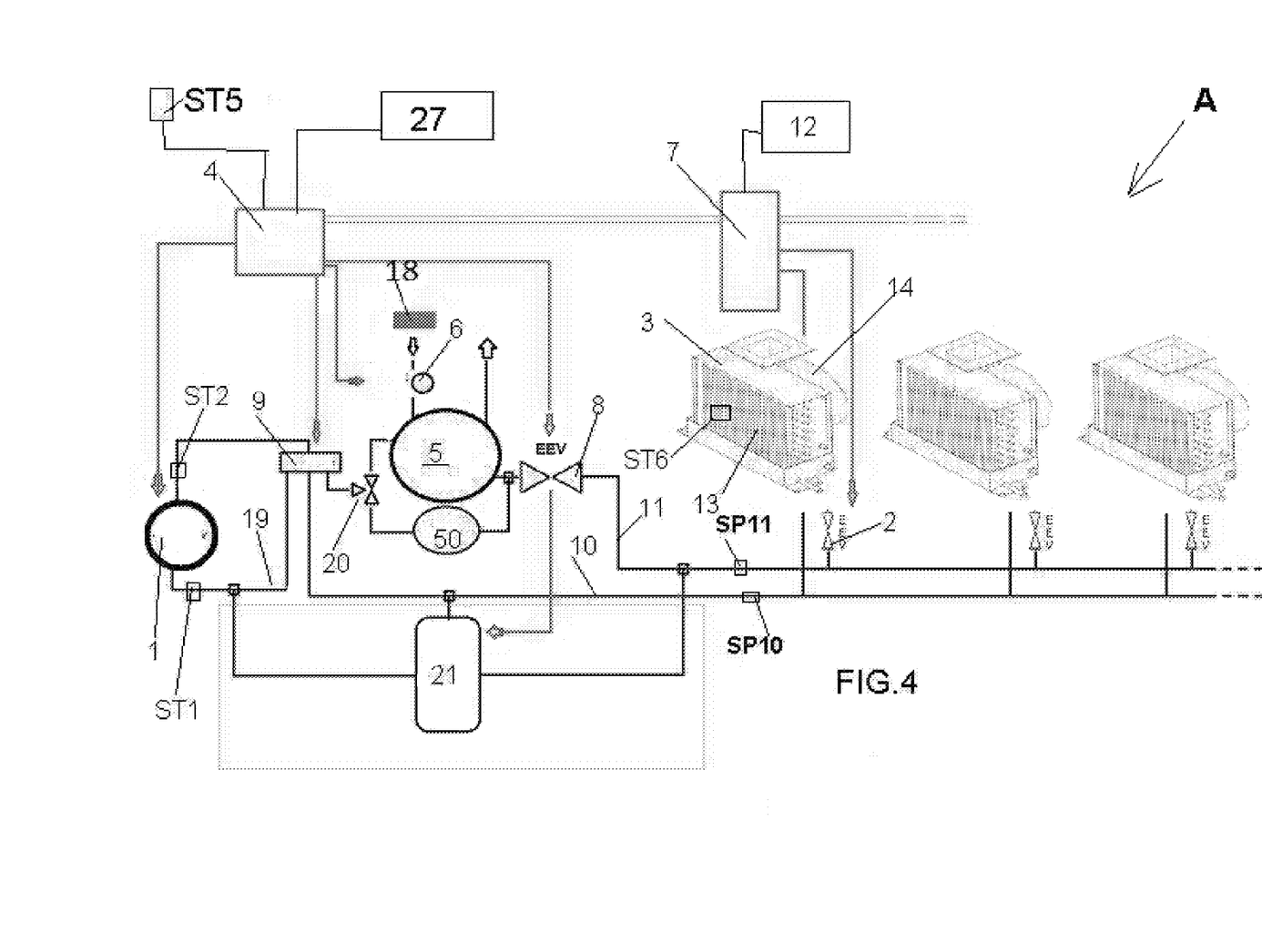
FIG. 4 is a schematic illustration of a fourth embodiment of the apparatus according to the invention.

Illustrated with reference to FIG. 4 is an embodiment of the apparatus comprising means 20, 21 operatively connected to the control unit 4, which are able to select one or more condensation circuits of smaller or greater length, in direct proportion to the corresponding lower or higher operating regimes of the compressor 1, in order to regulate the volume of working fluid that circulates in the apparatus.

In a preferred example of embodiment, the regulating means 20, 21 comprise an auxiliary condenser 50 set in parallel to the main condenser 5 via a partialization valve 20 and a backup reservoir 21, which is connected, via electronically controlled valves 24, 25, 26, upstream of the compressor 1, to the gas line 10 downstream of the four-way valve 9 and to the liquid line 11 downstream of the flow valve 8.

Advantageously, with this solution it is possible, at start-up of the apparatus, to reduce considerably the mass of working fluid, for example by 50%, and manage to cool the gas in circulation in a short time.

When the temperature of the coolant on the lines 10 and has an optimal value, the compression rate is relatively modest, and the system starts to take in again the working fluid with sequential injections on the intake line 10 and on the intake line upstream of the compressor 1.

The embodiment illustrated in FIG. 4 is particularly advantageous when the apparatus operates as heat pump, for example when it has to heat watercraft in Pole seawaters.

In these conditions, on account of the very cold climate, the temperature of return of the liquid gas on the line 11 towards the condenser 5/50 will in fact be very low and hence at a low pressure, which in a traditional system would entail the need to use an oversized condenser, with consequent higher production costs and encumbrance.

According to the invention, instead, the control unit is programmed for injecting gas at intake to the compressor when a low working temperature and low working pressure are detected.

In this way, given the same r.p.m. of the compressor a higher intake pressure is obtained, with a higher pressure of discharge of the compressor that will lead to a higher temperature of the delivery gas at inlet to the heat-exchanger.

Likewise, in apparatuses that envisage a large number of heat exchangers, the control logic envisages that there is instantaneous charging of gas in order to optimize operation of the compressor and of the condenser according to the number of the fan coils active and their thermal load.

In a further preferred embodiment, the apparatus may comprise infrared environmental sensors 27 connected to the control unit 4 or to the secondary control units 7 for detecting the presence of one or more persons present in the environment to be air-conditioned and for accordingly regulating the apparatus on the basis of the thermal power required for air-conditioning.

Figure 11:
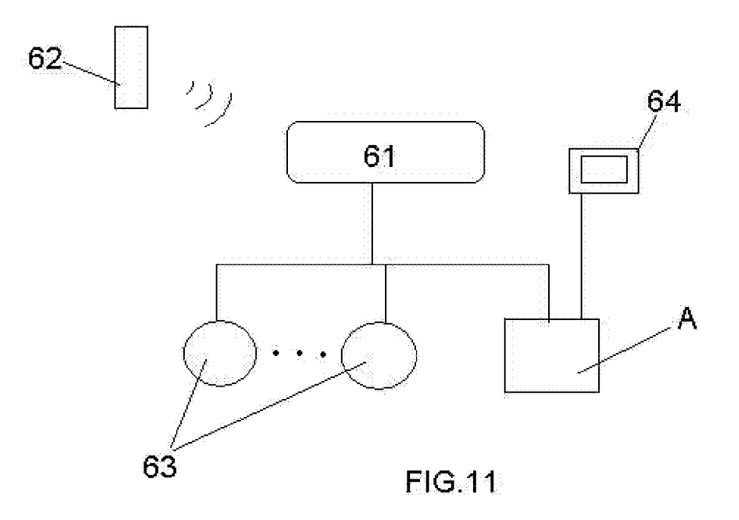
FIG. 11 is a schematic illustration of possible management and control interfaces of an apparatus according to the invention.

Furthermore, it is envisaged that the apparatus can be managed via remote control means 62 connected to the electronic control units 4/7 by means of wireless communication networks, such as GSM, UMTS, or WI-FI networks.

In a further preferred embodiment, the apparatus according to the invention enables the user to set, either from a touch screen 64 or some other interface, maximum consumption of electricity of the system, for example from 20% to 100% of the power that can be delivered. This is obtained with a dedicated software that controls the maximum r.p.m. of the inverter compressor 1 and the pressure of discharge (or condensation) of the compressor by means of a pressure probe and a temperature probe, thus determining electrical consumption in advance.

In yet a further preferred embodiment, setting of the consumption can be controlled also by means of a domotic system 61, possibly communicating with a remote terminal 62, which is connected to the control units 4/7 for managing simultaneity or otherwise of the loads 63 required in the environments inside the watercraft in order to optimize the load of a number of generators. For instance, if an electrical device, such as a microwave oven, is turned on, the apparatus A can be controlled by the domotic system 61 to reduce automatically absorption of the air-conditioning apparatus for a few minutes and then restore it when the device is turned off.

Figure 10:
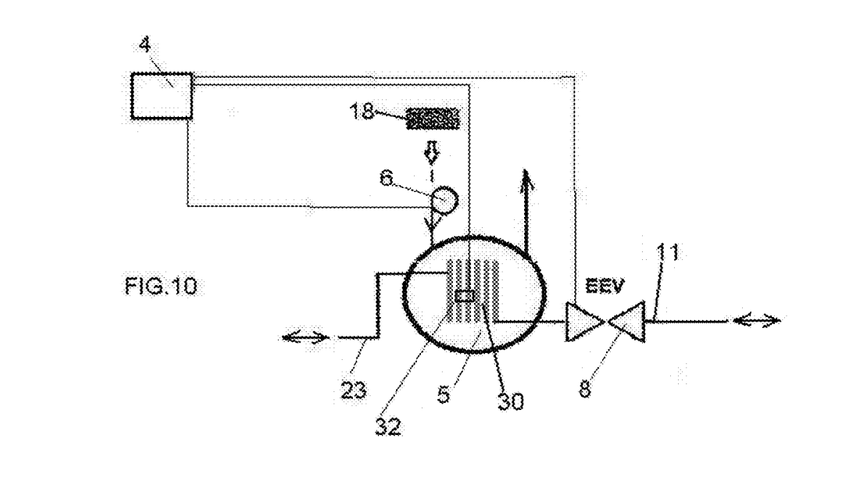
FIG. 10 is a schematic illustration of a water/gas heat-exchanger according to the invention.

Illustrated in FIG. 10 is a preferred embodiment of a heat-exchanger 60 according to the invention, comprising a tube-nest heat-exchange unit 30, set between a line 23 of flow of working fluid in the gaseous phase for connection to a compressor and a line 11 of flow of working fluid in the liquid phase, set in a relation of heat-exchange with a flow of water forced by a pump 6 and coming from a source 18, constituted for example by seawater.

The heat-exchanger further comprises an electronically regulated flow valve 8, set along the liquid line 11, and at least one sensor 32 for detecting the temperature of condensation/evaporation of the working fluid, and an electronically controlled water pump 6 for regulating the flow rate of the water coming from the source 18.

According to the invention, the heat-exchanger is provided with an electronic control unit 40 operatively connected to the sensor 32, to the valve 8, and to the pump 6 for regulating the flow of coolant and of water on the basis of a difference of temperature between the temperature detected and a desired optimal temperature of condensation/evaporation of the working fluid.

Preferably, the heat-exchanger 60 further comprises means 33, 34 (set inside and/or outside the heat-exchanger) for storage of an amount of working fluid treated and condensed at the desired temperature in order to create a thermal flywheel that will optimize operation of the compressor and reduce energy consumption.

Figure 10A:
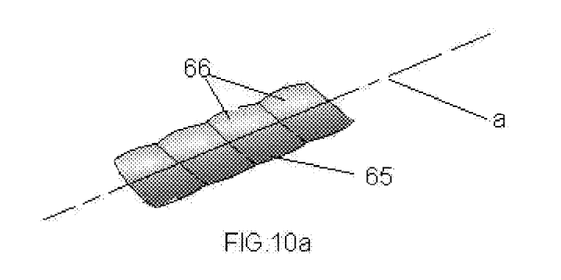
FIG. 10A shows a stretch of piping of a heat-exchanger according to FIG. 10.

In a preferred embodiment, the tubes 65 that constitute the unit 30 and through which the coolant gas is made to pass within the heat-exchanger are made of titanium and have a coiled shape (for example, the shape of a coil wound along the longitudinal axis a with one turn 66 per centimeter of length) to offer a larger heat-exchange surface and to increase in a controlled way the turbulence of the gas inside in order to increase efficiency of the heat-exchanger and reduce the overall dimensions thereof.

The invention has been described with reference to a preferred embodiment. Equivalent elements may be used, without thereby departing from the sphere of protection or scope of the patent right granted.

The invention claimed is:

1. An apparatus for air-conditioning of environments in the marine field, comprising:
    an electronically controlled variable-r.p.m. compressor (1) for compression of a mass of a phase-change working fluid, supplied by a line (10) of a fluid in the gaseous phase and communicating with a duct (19) for outlet of a flow of the fluid in the form of compressed gas;
    a main gas/water condenser (5), which communicates with a duct (23) carrying fluid in the gaseous phase, with a duct for passage of a flow of seawater (18) delivered by an electronically controlled variable-r.p.m. pump (6), and with a line (11) of fluid in the liquid phase;
    at least one environmental heat-exchanger (3) comprising one or more evaporation/condensation thermal batteries (13) communicating with said line (11) of working fluid in the liquid phase and with said line (10) of working fluid in the gaseous phase, and provided with working-fluid evaporation/condensation thermal batteries (13, 15, 16) for thermal conditioning of a flow of air emitted by an electronically controlled fan (14);
    an electronically controlled four-way valve (9) in communication with said gas line (10), with the inlet and the outlet of said compressor (1), and with said condenser (5);

at least one electronically controlled flow valve (8) set along said line (11) of working fluid in the liquid phase;

a first temperature sensor (ST1) and a second temperature sensor (ST2) for detection of the temperature of the gas (Tg_in; Tg_out) at inlet to and outlet from said compressor (1), respectively;

a temperature sensor (ST7) for detection of the surface temperature of the ducts of the gas line (10);

a temperature sensor (ST8) for detection of the surface temperature of the ducts of the liquid line (11);

a pressure sensor (SP10) for detection of the pressure in the line (10) of working fluid in the gaseous phase;

a pressure sensor (SP11) for detection of the pressure in the line (11) of working fluid in the liquid phase;

a sensor (ST5) for detection of the temperature of said environment (T_a);

temperature sensors (ST9, ST10) for detection of the temperature of the working fluid at inlet to and outlet from said condenser, respectively;

temperature sensors (ST11, ST12) for detection of the temperature of the water at inlet to and outlet from said condenser, respectively; and at least one first programmable electronic control unit (4) operatively connected to:
  said compressor (1);
  said flow valve (8);
  said sensors (ST1, ST2) for detecting the temperature of the gas (Tg_in; Tg_out) at inlet to and outlet from said compressor, respectively;
  said sensors (ST7, ST8) for detecting the temperature of the ducts of the gas line (10) and liquid line (11), respectively;
  said sensors (SP10, SP11) for detecting the pressure of the working fluid in the gas line (10) and liquid line (11), respectively;
  said sensor (ST5) for detecting the ambient temperature;
  said fan (14) of the heat-exchanger (3);
  input means (12) for entering a desired ambient temperature (T_ad); and
  said pump (6), wherein said first control unit (4) is programmed for calculating continuously a detected temperature deviation (DeltaT=T_ad−T_a) and, as a function of said temperature deviation, for regulating in combination:
  the r.p.m. of the compressor (1) on the basis of a pre-set operating curve for obtaining an output temperature of the compressed gas (T_out) associated to the detected value of said temperature deviation (DeltaT) and to a predetermined value of said input temperature (Tg_in) between −10 C° and +10 C°;
  opening of the flow valve (8) for maintaining a desired optimal value of the temperature on the liquid line (11) and of the temperature of the fluid reaching the heat-exchanger (3);
  the r.p.m. of the fan (14) of the heat-exchanger (3) for maintaining a pre-set optimal value of the temperature of evaporation/condensation of the gas in the evaporation/condensation thermal batteries (13) for the purposes of efficiency of the thermal cycle; and
  the capacity of said pump (6) for maintaining a pre-set optimal value of the temperature of evaporation/ condensation of the working fluid in the condenser (5) for the purposes of efficiency of the thermal cycle, wherein said control unit (4):
  in a step of acceleration of the compressor (1), is programmed for controlling whether the latent thermal power to the heat exchangers (3) is greater than a given percentage of the sensible power and in this case reducing accordingly the r.p.m. of the compressor (1);
  in a deceleration step, is programmed to require of the compressor a power substantially equal to the difference between the calculated power and the latent power; and
  in the step of maintenance of the desired ambient temperature, is programmed so that the sum of the sensible power and of the latent power substantially coincides with the dissipated energy produced.

2. The apparatus according to claim 1, comprising at least one second electronic control unit (7) associated to said environmental heat-exchanger (3) and operatively connected to said first control unit (4), to said fan (14) of the environmental heat-exchanger (3), to said sensor (ST5) for detecting the ambient temperature, and to said means (12) for entering a desired ambient temperature (T_ad), in order to carry out continuous calculation of the temperature deviation detected (DeltaT=T_ad−T_a) and, on the basis of the latter, to manage the instantaneous power demand, and further comprising an electronically controlled expansion valve (2) set along said line (11) of fluid in the liquid phase and associated to said environmental heat-exchanger (3);
  wherein said second control unit (7) is programmed for regulating in combination the r.p.m. of the fan (14) of the heat-exchanger (3) and opening of the expansion valve (2) in order to maintain a pre-set optimal value of the temperature of evaporation/condensation of the gas in the evaporation/condensation thermal batteries (13) for the purposes of efficiency of the thermal cycle, and reach more rapidly the value of the ambient temperature set.

3. The apparatus according to claim 1, comprising selection means (20) operatively connected to said control unit (4) that are able to select one or more condensation circuits (5, 50) of smaller or greater length, in direct proportion to corresponding lower or higher operating regimes of the compressor (1).

4. The apparatus according to claim 1, wherein said evaporation/condensation thermal batteries are comprised in a water/gas heat-exchanger (15) associated to a fancoil via lines (17, 28) for delivery and return of water.

5. The apparatus according to claim 1, wherein said evaporation/condensation thermal batteries are comprised in an air evaporator (16) associated to a fan.

6. The apparatus according to claim 1, comprising volume regulating means (20, 21) connected to said control unit (4) for regulating the volume of working fluid that circulates in the apparatus.

7. The apparatus according to claim 6, wherein said volume regulating means (20, 21) comprise: an auxiliary condenser (50) set in parallel to the main condenser (5) via a partialization valve (20); and a backup reservoir (21) connected, via electronically controlled valves (24, 25, 26) upstream of the compressor (1), to the gas line (10) downstream of the four-way valve (9) and to the liquid line (11) downstream of the flow valve (8).

8. The apparatus according to claim 1, comprising infrared environmental sensors operatively connected to one of said control units (4, 7) for detecting the presence of one or more persons in the environment to be air-conditioned and accordingly regulating the compressor (1).

9. The apparatus according to claim 2, comprising wireless remote control means operatively connected to one of said electronic control units (4, 7) by means of wireless communication networks, such as GSM, UMTS, or Wi-Fi networks.

10. The apparatus according to claim 1, wherein said means (12) for entering a desired ambient temperature comprise a display of the touch-screen type.

11. The apparatus according to claim 2, wherein said first and second control units (4, 7) are connected via a two-wire digital data line (68).

* * * * *